United States Patent Office 3,311,632
Patented Mar. 28, 1967

3,311,632
3-ACETYL-CINCHONINIC ACID COMPOUNDS
Hermann Bretschneider, Innsbruck-Arzl, Austria, Kraft Hohenlohe-Oehringen, Cambridge, Mass., and Alfred Rhomberg, Innsbruck, Austria, assignors to Hoffmann-La Roche Inc., Nutley, N.J., a corporation of New Jersey
No Drawing. Filed Mar. 4, 1964, Ser. No. 349,488
Claims priority, application Switzerland, Mar. 13, 1963, 3,168/63; Aug. 7, 1963, 9,744/63
7 Claims. (Cl. 260—287)

This invention relates, in general, to a novel class of compounds. More particularly, the invention relates to 3-acyl-cinchoninic acids, either unsubstituted or substituted in the benzene ring, and to mixed anhydrides and amides, thereof, as well as to processes for producing same.

Thus, this invention embraces 3-acyl-cinchoninic acids having the formula

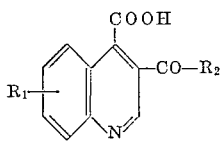

(I)

in which the symbol $R_1$ represents a hydrogen atom, a halogen atom, i.e. fluorine, chlorine or bromine atom, a trihalogeno-methyl group, for example, a trifluoromethyl group, a nitro group, a lower alkyl group, for example, a methyl, ethyl, propyl, etc. radical or a lower alkoxy group, for example, a methoxy, ethoxy, propoxy, etc. radical; and in which the symbol $R_2$ represents a lower alkyl group, particularly an alkyl group containing from 1 to 6 carbon atoms, such as methyl, ethyl, propyl, butyl, hexyl, etc. radical, an aryl group, particularly a phenyl group or an aralkyl group, such as, a benzyl or phenethyl radical.

Moreover, due to the relative 1,4-position of the carboxyl to carbonyl function, the 3-acyl-cinchoninic acids of Formula I are capable of forming two anhydrides. The present invention encompasses such anhydrides within its scope. These anhydrides, denoted hereinafter as the normal anhydride [II(a)] and as the pseudoanhydride [II(b)], have the formulas as follows:

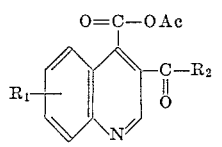

(IIa)

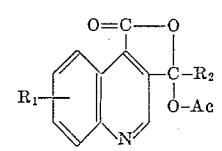

(IIb)

In each of the foregoing Formulas IIa and IIb, the symbols $R_1$ and $R_2$ have the same significance as the corresponding symbols in Formula I. The symbol "Ac," which appears in each of Formulas IIa and IIb, represents an acyl residue of the acid which reacts with the 3-acyl-cinchoninic acid of Formula I to yield the desired anhydride. The mixed anhydrides with lower aliphatic carboxylic acids have been found to be especially interesting compounds. This is especially true of the mixed pseudoanhydride with acetic acid, that is, the compound of Formula IIb in which the symbol "Ac" represents the —COCH₃ radical. This acetic acid mixed anhydride represents an especially reactive functional derivative of the 3-acyl-cinchoninic acids.

Furthermore, by reacting the anhydrides and/or pseudoanhydrides of Formula IIa and Formula IIb with secondary heterocyclic or secondary aliphatic amines, such as, piperidine, pyrrolidine, morpholine, piperazine, dialkyl amines, for example, dimethyl amine, diethyl amine, dipropyl amine, etc. there is obtained the corresponding acid amides. Such amides are encompassed within the scope of this invention and they are represented by the formula

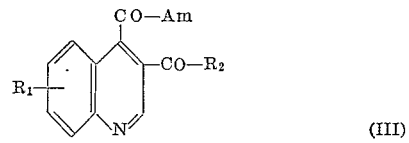

(III)

in which the symbols $R_1$ and $R_2$ have the same significance as the corresponding symbols in Formula I; and wherein the symbol "Am" represents the residue of the secondary heterocyclic or aliphatic amine used for the amide formation.

Thus, the symbol "Am" as it appears in Formula III represents, for example, a piperidino, pyrrolidino, morpholino, piperazino or a dialkylamino residue.

The compounds of this inventon, that is, the 3-acyl-cinchoninic acids, the mixed anhydrides and the amides thereof, are readily prepared. Broadly, the process comprises reacting an isatin of the formula

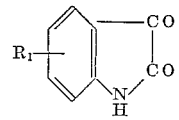

(IV)

in which $R_1$ represents a hydrogen atom, a halogen atom, for example, fluorine, chlorine, or bromine atom, a trihalogenomethyl group, such as, a trifluoromethyl radical, a nitro group, a lower alkyl group, such as a methyl, ethyl, propyl, etc. radical or a lower alkoxy group, such as a methoxy, ethoxy, propoxy, etc. radical
with an aqueous alkali to form the corresponding isatinic acid. Such acid is subsequently reacted either with a compound having the formula $$R_3O—CH=CH—CO—R_2 \quad (Va)$$

or with a compound having the formula

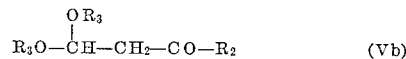

in each of which formulas the symbol $R_2$ represents a lower alkyl group, particularly an alkyl group containing from 1 to 6 carbon atoms, such as a methyl, ethyl, propyl, butyl, hexyl, etc. radical, an aryl group, preferably a phenyl radical, an aralkyl group, such as a benzyl or phenethyl radical; and in which the symbol $R_3$ represents a lower alkyl group, preferably a methyl or ethyl radical.

The reaction of the Formula IV compound with either the Formula Va or Vb compound yields a 3-acyl-cinchoninic acid of the type depicted in Formula I, supra. Such acid can be converted readily to the mixed anhydride of Formula IIa or IIb, if desired. The mixed anhydride, in turn, can be reacted with a secondary amine to give the corresponding 3-acyl-cinchoninic acid amides of Formula III.

As the starting isatinic of Formula IV, in which the symbol $R_1$ does not represent a hydrogen atom but rather one of the other named substituents, there are used, preferably, isatins in which the $R_1$ substituent is located at one of the positions 5, 6 or 7 of the phenyl nucleus. Isatins which are substituted in the 4-position, while suited for use in the practice of this invention, are less suitable for the cyclization reaction, presumably on steric grounds. Similarly, a nitro-substituted isatin, in which the nitro group is substituted in the 5-position, while suited for use, is not a preferred starting material.

In the first step of the process of this invention, the isatin of Formula IV is split, in a manner known per se, using aqueous alkali. As the aqueous alkali one can use, for example, a caustic potash solution. Such reaction yields an isatinic acid having the formula

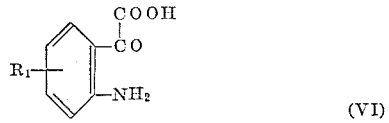

(VI)

or an alkali salt thereof.

In a next subsequent step, the isatinic acid compound of Formula VI, without having been first isolated, is reacted with an enol ether of Formula Va or with an acetal of Formula Vb. For example, in the second step of the process the isatinic acid compound of Formula VI is reacted with 1-methoxy-buten-(1)-one-(3) or 1,1-dimethoxy-butanone-(3). Such reaction results in the formation of the corresponding 3-acyl-cinchoninic acid of Formula I. In this step of the process it is preferred to react the isatinic acid of Formula VI with a compound of Formula Va, that is, an enol ether of β-keto-aldehyde of the formula $OHC-CH_2-CO-R_2$. Presumably, when the Formula Vb compounds, that is, dialkyl-acetals of said β-keto-aldehydes are used, these are converted into the correspondnig enol ethers of Formula Va, under the prevailing reaction conditions by the splitting off of one molecule of $R_3OH$.

In one particular mode of carrying out the process of this invention, the isatinic acid of Formula VI is reacted with the enol ether of Formula Va or with the acetal of Formula Vb in a soda-alkaline solution. In this particular method, the enol ether or the acetal component is allowed to react upon a soda-alkaline solution of the isatinic acid intermediate product. In this reaction there is produced a non-cyclized condensation product to which Formula VIIa, or the tautomeric Formula VIIb, shown hereinafter, can be ascribed.

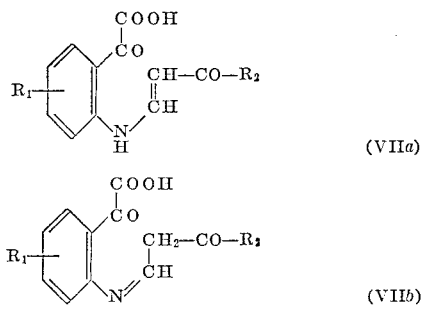

(VIIa)

(VIIb)

This non-cyclized product, the first stage of the 3-acyl-cinchoninic acid, is precipitated from the soda-alkaline solution, as a yellow crystalline product, by acidification, for example, using hydrochloric acid. This product, when heated in solution, for example, when heated in a soda-alkaline solution at a temperature within the range of from about 60° to 90° C., preferably, about 75° C., is readily cyclized with the additional splitting off of water to yield the 3-acyl-cinchoninic acid of Formula I. In the alternative, the cyclization can be carried out using other cyclizing agents and methods. Thus, for example, the cyclization can be effected by heating the non-cyclized compound with a relatively dilute aqueous mineral acid, for example, hydrochloric acid or with dilute caustic soda. The 3-acyl-cinchoninic acid, in the form of a free base or in the form of an acid addition salt thereof, for example, the hydrochloride salt, is precipitated from the soda-alkaline solution by the addition of acid.

The 3-acyl-cinchoninic acids which are obtained in the practice of this invention, possess valuable pharmacological properties. More specifically, the 3-acyl-cinchoninic acids have been found to be useful as antirheumatic agents. Furthermore, the 3-acyl-cinchoninic acids, as anhydrides thereof, particularly the mixed pseudoanhydrides with acetic acid, are valuable intermediate products for the manufacture of pharmacologically active compounds, such as, for example, 3-acetyl-cinchoninic acid piperidide. The latter compound will find widespread use due to its antipyretic, anti-inflammatory and analgesic properties. The conversion of the 3-acyl-cinchoninic acid anhydrides of Formulas IIa and IIb into amides derived from secondary amines can be effected by methods known per se. For example, such conversion can be accomplished by heating the mixture of a 3-acyl-cinchoninic acid mixed anhydride, such as, a 3-acyl-cinchoninic acid acetic acid mixed anhydride, with a suitable secondary amine in the presence of a solvent or diluent, such as benzene.

For a fuller understanding of the nature and objects of this invention, reference may be had to the following examples which are given merely as further illustrations of the invention and are not to be construed in a limiting sense.

EXAMPLE 1

(a) 147.1 grams (1 mol) of isatin were introduced into 200 ml. of 35% caustic potash to form isatinic acid. Upon slight heating, a clear solution was obtained. This solution was neutralized with hydrochloric acid and immediately thereafter it was made alkaline with saturated soda solution. Subsequently, the clear solution was cooled to room temperature, following which it was treated with 120 grams (1.2 mol) of 1-methoxy-buten-(1)-one-(3). The mixture was allowed to stand for a period of 10 minutes at room temperature, thereafter cooled to a temperature of 0° C. and finally acidified with concentrated hydrochloric acid. A yellow colored oily product precipitated out of solution, such product becoming rapidly crystalline by stirring. About 200 ml. of concentrated hydrochloric acid was then added until the precipitation was quantitative.

The yellow precipitate which represents the non-cyclized first stage of the 3-acetyl-cinchoninic acid was filtered off and washed with cold water, ethanol and ether.

The first stage of the 3-acetyl-cinchoninic acid, the production of which is described in the preceding paragraphs, was a yellow microcrystalline compound. The freshly precipitated compound melted at 135° C. The melting point of the compound rose to 215° C. after storage for a period of about 14 days. The higher melting compound, however, manifested the same chemical properties as the freshly precipitated compound. The compound was practically insoluble in water, ether and chloroform, slightly soluble in alcohol and acetone and soluble in dimethylformamide. Upon heating with aqueous hydrochloric acid and with dilute caustic soda, the compound cyclized, with the splitting off of water, to yield 3-acetyl-cinchoninic acid.

(b) The crude product, obtained as described in the preceding paragraph, was dissolved in 1000 ml. of cold saturated soda solution and the solution was heated to a temperature of about 75° C. on a water-bath. While still warm, the solution was acidified to pH 2.5 with hydrochloric acid to effect, by precipitation, the separation of the free 3-acetyl-cinchoninic acid in the form of the hydrate which is difficultly filterable. This compound was converted into the more easily filterable anhydrous form with decomposition point at 228° to 230° C., without difficulty, by boiling and grinding. The 3-acetyl-cinchoninic acid crystallized from ethanol in the form of white crystals which were moderately soluble in ethanol and in water but practically insoluble in ether and in chlorofrom.

(c) 100 grams of 3-acetyl-cinchoninic acid were suspended in 250 ml. of acetic acid anhydride and heated to boiling under reflux for a period of 30 minutes. Thereafter, the excess acetic acid anhydride was distilled off under diminished pressure. The residue was taken up in 200 ml. of benzene and, after the addition of 10 grams of animal carbon, heated on a boiling water-bath for 5 minutes. After removal of the animal carbon by filtration, the filtrate was concentrated by distilling off about 100 ml. of benzene, treated with 50 ml. of petroleum ether and adjusted for purpose of crystallization. There was thus obtained 108 grams of 3-acetyl-cinchoninic acid acetic acid pseudoanhydride: melting point at 116.5° C. (from benzene or ethanol). The compound was soluble in benzene, ethanol and acetic ester, difficultly soluble in ether and practically insoluble in cold and hot water. The compound was distilled, without attendant decomposition, in a high vacuum.

(d) To 50 grams of the 3-acetyl-cinchoninic acid acetic acid pseudoanhydride (crude product), obtained as described in the preceding paragraph, in 200 ml. of benzene, there was added 25 grams of piperidine. The mixture was heated to boiling under reflux for a period of 30 minutes, treated with 5 grams of animal carbon and, after an additional 5 minute period, filtered. The benzene and the excess piperidine were distilled off under diminished pressure. The residue was taken up in 100 ml. of ethanol, treated with 30 ml. of petroleum ether and allowed to cool. Upon cooling, mostly crystalline 3-acetyl-cinchoninic acid piperidide separates out, melting at 118° to 121° C. (from water or ethanol). The piperidide is practically insoluble in cold water; it is very readily soluble in ethanol and difficultly soluble in ether.

EXAMPLE 2

5 grams of isatin were dissolved in 14 ml. of 35% caustic potash and to this solution there was added 9 grams of 1,1-dimethoxy-butanone-(3). The mixture was allowed to stand for a period of 1 hour at a temperature of 20° C. following which it was allowed to stand a further 30 minutes at a temperature of 75° to 80° C. The mixture was, subsequently, acidified to a strong acid reaction with hydrochloric acid at a temperature of 0° C., whereby a yellow precipitate separated out. This precipitate, without first separating it by filtration, was again brought into solution by the addition of sufficient 35% caustic potash to make the solution alkaline and heating to a temperature of 70° C. for a period of 5 minutes. Upon acidification of this solution with hydrochloric acid to pH 1.5 to 2, the crude 3-acetylcinchoninic acid precipitated out. After recrystallization of the compound from ethyl alcohol, there was obtained 3-acetylcinchoninic acid of decomposition point 228° to 230° C.

This compound formed white crystals from alcoholic solution which are moderately soluble in alcohol and in water but are practically insoluble in ether and in chloroform.

EXAMPLE 3

50 grams of 5-methyl-isatin were introduced into 100 ml. of 20% caustic potash to bring about formation of 5-methyl-isatinic acid. Upon slight warming a clear solution was obtained. 46.5 grams of 1-methoxy-buten-(1)-one-(3) (corresponding to 1.5 mol of methoxy-butenone for 1 mol of isatin) were added to the solution and the mixture, while cooling with ice, was acidified with hydrochloric acid until the firstly oily, but readily becoming crystallized, yellow intermediate product, had completely precipitated. Such product forms first as an oil but it becomes crystalline quite rapidly. In order to remove any small amount of uncondensed isatin present, the intermediate product was dissolved in about 450 ml. of cold saturated bicarbonate solution. The insoluble residue, representing insignificant amounts of uncondensed isatin, were removed by filtration. To the filtrate, there was added 100 ml. of saturated soda solution. The mixture was then heated for a period of 30 minutes at a temperature of 80° C. Subsequently, animal carbon, about 5.0 grams, was added thereto and the mixture was heated to boiling for a short time. After filtration, the hot solution was acidified to pH 1 with hydrochloric acid to precipitate a voluminous hydrate form of the 3-acetyl-6-methyl-cinchoninic acid. After recrystallization from methanol, there was obtained pure 3-acetyl-6-methyl-cinchoninic acid of decomposition point 239.5° to 241° C. The compound crystallized from methanol in the form of white needles. The compound was found to be moderately soluble in alcohol and in acetone, slightly soluble in water and practically insoluble in ether.

20 grams of 3-acetyl-6-methyl-cinchoninic acid, produced as described in the preceding paragraph, were heated to boiling under reflux for a period of 30 minutes in 70 ml. of acetic acid anhydride. Thereafter, the excess acetic acid anhydride was distilled off under reduced pressure. The evaporation residue was taken up in about 40 ml. of benzene. Upon cooling, the 3-acetyl-6-methyl-cinchoninic acid acetic acid pseudoanhydride crystallized out. The compound had a melting point of 110–112° C. The compound was found to be moderately well soluble in acetone and in benzene and insoluble in ether and in water. Furthermore, the compound proved to be soluble in alcohol but partial alcoholysis occurs.

EXAMPLE 4

3-acetyl-7-methyl-cinchoninic acid was produced from 6-methyl-isatin and 1-methoxy-buten-(1)-one-(3) in the manner described in Example 3. The compound had a decomposition point at 245° to 246° C. The compound was found to be moderately soluble in alcohol, acetone and in hot water. It was, however, practically insoluble in ether and in chloroform.

The 3-acetyl-7-methyl-cinchoninic acid was converted into 3-acetyl-7-methyl-cinchoninic acid acetic acid pseudoanhydride by the procedure described in Example 3. The melting point of the crude pseudoanhydride was 121° to 123° C.

EXAMPLE 5

5 grams of 6-chloro-isatin were introduced into 100 ml. of 20% caustic potash to form 6-chloro-isatinic acid. Upon slight warming, a clear solution resulted. This solution was cooled with ice and rapidly introduced, with stirring, into a mixture of 30 grams of 1-methoxy-buten-(1)-one-(3) and 200 ml. of hydrochloric acid. The latter mixture was likewise cooled with ice. Furthermore, since the 1-methoxy-buten-(1)-one-(3) is unstable in acid solution, in producing the mixture thereof with hydrochloric acid it was necessary to introduce that compound directly into previously cooled hydrochloric acid prior to the reaction with the isatinic acid solution. After the addition of the isatinic acid solution was completed, there was precipitated the non-cyclized yellow intermediate product in the form of an oil, which subsequently, crystallized. Such intermediate product was dissolved in 250 ml. of cold saturated sodium bicarbonate solution. The insoluble residue, comprising unreacted 6-chloro-isatin was filtered off. To the filtrate there was added 50 ml. of soda solution, following which the mixture was heated to a temperature of 80° C. for 30 minutes. Then, about 5.0 grams of animal carbon were added to the mixture and the mixture was heated to boiling for a short time. After filtration, the solution, while still hot, was acidified to pH 1 with hydrochloric acid. Acidification brought about precipitation of a voluminous hydrate form of 3-acetyl-7-chloro-cinchoninic acid. After recrystallization from ethanol, there was obtained 3-acetyl-7-chloro-cinchoninic acid having a decomposition point at 231° to 235° C. From alcohol the compound forms slightly brownish colored crystals which are moderately soluble in alcohol but practically insoluble in water, ether and chloroform.

20 grams of 3-acetyl-7-chloro-cinchoninic acid, produced as described in the preceding paragraph, were heated to boiling under reflux for a period of 30 minutes in 70 ml. of acetic acid anhydride. Thereafter, the excess acetic acid anhydride was distilled off under reduced pressure. The evaporation residue was then taken up in 50 ml. of absolute benzene. Upon cooling, 3-acetyl-7-chloro-cinchoninic acid acetic acid pseudoanhydride crystallized out. After recrystallization from absolute acetone the compound melted at 144° to 145° C. The pseudoanhydride formed white crystals from benzene or acetone which are practically insoluble in water and in ether. The compound was found to dissolve somewhat better in alcohol but partial alcoholysis occurred.

EXAMPLE 6

3-acetyl-6-chloro-cinchoninic acid is obtained from 5-chloro-isatin and 1-methoxy-buten-(1)-one-(3) in the manner described in Example 5. The compound crystallized from ethanol in the form of white crystals with melting point of 228° to 229.5° C. Such crystals were practically insoluble in water and ether. The thus obtained 3-acetyl-6-chloro-cinchoninic acid was converted into 3-acetyl-6-chloro-cinchoninic acid acetic acid pseudoanhydride by the method described in Example 5. The melting point of the crude pseudoanhydride was 168° to 172° C.

EXAMPLE 7

30 grams of isatin were introduced into 60 ml. of 20% caustic potash to effect formation of isatinic acid. After a short heating period, a clear solution was formed. The solution was cooled with ice, following which 39.5 grams of 1-methoxy-3-phenyl-propen-(1)-one-(3) were added thereto. Since this compound was insoluble in the system, both phases were mixed by vigorous mechanical stirring. The mixture was then acidified with about 100 ml. of ice-cold hydrochloric acid and stirred for an additional 15 minute period. There was formed an orange colored oily intermediate product which crystallized out upon standing. The product was obtained as a large granular crystallizate by filtration and washed with water. In order to remove any traces of the uncondensed isatin starting material present, the intermediate product, that is, the non-cyclized first stage of the 3-benzoyl-cinchoninic acid, was introduced into 350 ml. of saturated bicarbonate solution. The insoluble isatin was filtered off. To the filtrate there was added 50 ml. of saturated soda solution and the mixture was heated to 80° C. for 30 minutes. Then animal carbon was added to the mixture which was then heated to boiling for about 5 minutes. After filtration, the solution, while still hot, was acidified to pH 1 with hydrochloric acid to effect precipitation of 3-benzoyl-cinchoninic acid. The precipitate was removed by filtration and recrystallized from ethanol. Colored impurities were washed out with ether. There was thus obtained pure 3-benzoyl-cinchoninic acid of decomposition point 236° to 237° C. The 3-benzoyl-cinchoninic acid was found to be almost insoluble in ether and in water. The compound was more soluble in alcohol, but it precipitated therefrom in the form of leaflet-like crystals.

An almost neutral-reacting aqueous solution was obtained as follows:

1 gram of 3-benzoyl-cinchoninic acid was suspended in 10 ml. of distilled water and 0.6 gram of sodium bicarbonate was added thereto. By agitation and slight heating there was obtained a clear solution of approximate pH 7.5.

The 3-benzoyl-cinchoninic acid was converted into 3-benzoyl-cinchoninic acid acetic acid pseudoanhydride, melting point at 136° to 138.5° C., in the manner described in Example 5.

We claim:
1. 3-acetyl-cinchoninic acid acetic acid pseudoanhydride.
2. 3-acetyl-6-methyl-cinchoninic acid acetic acid pseudoanhydride.
3. 3-acetyl-7-methyl-cinchoninic acid acetic acid pseudoanhydride.
4. 3-acetyl-7-chloro-cinchoninic acid acetic acid pseudoanhydride.
5. 3-acetyl-6-chloro-cinchoninic acid acetic acid pseudoanhydride.
6. 3-benzoyl-cinchoninic acid acetic acid pseudoanhydride.
7. 3-acetyl-cinchoninic acid piperidide.

References Cited by the Examiner

Burger, Medicinal Chemistry, 2d edition, Interscience, 1960 pp. 42–3.

Stefanovic et al., Tetrahedron, vol. 6, 97–102, Abstract in Chem. Abstracts, vol. 53, col. 21947–8 (1959).

ALEX MAZEL, *Primary Examiner.*

DONALD G. DAUS, *Assistant Examiner.*